Nov. 17, 1964  G. N. BURWELL  3,157,800
SNOW AND SLEET DETECTORS AND SYSTEMS
Filed Oct. 30, 1961

INVENTOR
GARWOOD N. BURWELL

BY
ATTORNEY

United States Patent Office 3,157,800
Patented Nov. 17, 1964

3,157,800
SNOW AND SLEET DETECTORS AND SYSTEMS
Garwood N. Burwell, Maplewood, N.J., assignor to The
Rails Company, Maplewood, N.J.
Filed Oct. 30, 1961, Ser. No. 148,658
3 Claims. (Cl. 307—116)

My invention relates to snow and sleet detectors and systems with particular reference to such devices for use on railroad lines, particularly at switches where snow, sleet or hail precipitation could interfere with the proper operation of a switch and possibly cause a wreck.

The precipitation sensing head is preferably placed against a tie between a stock rail and the movable switch point at a location where there is clearance, and thus detect not only falling snow but also drifting snow and snow carried by, or propelled by, passing trains. If desired, however, it may be pole mounted to indicate falling snow, snow depth or drifting.

My warning system comprises a sensing head having two electrically conductive grids spaced about 1/16 inch apart, a coarse mesh above and a fine mesh screen below. Any precipitation falling through the upper grid on to the lower grid, electrically connecting the two, permits a small current to pass in a circuit which includes the two grids in series. This current may be amplied, as by a transistor, to operate a relay or an indicator or both.

In my preferred system it causes the operation of a timing motor with a pre-set cycle to continually sense the prevailing conditions, as will be explained.

Below the grids in the sensing head may be placed a resistance heater to keep the snow or ice slowly melting and thus permit the grids to clear themselves. When used in conjunction with switch heaters, which the system may or may not activate, the heat from the nearby rail will hasten clearing of the grids. With the addition to the detector circuit of a thermostat responsive to the ambient air temperature, a safeguard is provided against snow indications at melting temperature or mere rain precipitation.

At remote points, several sensing heads at varying heights may be used to give an indication of snow depths. Many other uses will occur, as for example, determination of dangerous roof loads.

With the foregoing and other objects in view, my invention resides in the combination and arrangement of parts, in the details and methods of construction and connection described in this specification and particularly pointed out in the appended claims, it being understood that changes may be made in the particular embodiment of the invention, within the scope of what is claimed, without departing from the spirit of the invention. I intend no limitation other than those of the claims when fairly interpreted in the light of the full disclosure and the present state of the art.

Figure 1:
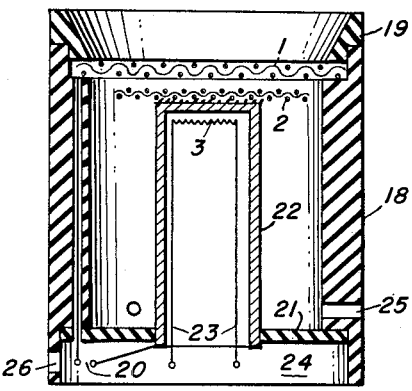
Figure 2:
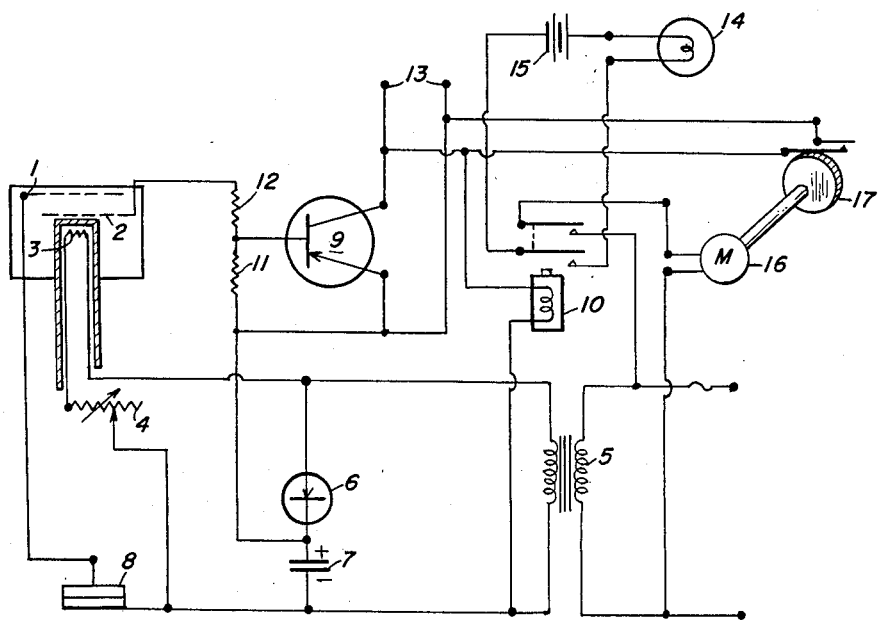

Referring now to the accompanying drawing illustrative of a preferred construction and system embodying my invention as at present preferred, FIG. 1 illustrates in vertical section, a sensing head; FIG. 2 illustrates a preferred circuit and system for railroad switch use. Similar reference charcters refer to similar parts throughout the drawings.

Preferably the unified sensing head comprises a tubular casing 18 of dielectric material with a top 19 which clamps the coarse grid 1 in position, a connecting wire extending down through the wall of the casing. A finer lower grid screen 2, preferably 18 x 18 mesh, is soldered over the closed end of a brass tube 22 mounted in an insulation plate 21 and a connecting wire pairing with the other grid wire at 20. The tube 22 contains a heater 3 which is actually a cartridge type with terminals 23. Drainage openings 25 and a cable entrance 26 are provided and the space 24 is sealed with silicone rubber (not shown).

Turning now to FIG. 2, in the present field-tested embodiment of my invention, the heater 3 is placed to heat the lower grid 2 and regulated by a variable resistance 4 in series with heater 3 and the power source which may be a battery or other direct current supply but, in railroad work, is preferably a step down transformer 5 connected to the transmission line and having a secondary of about 12.5 volts. Across the secondary is placed a diode 6 and a condenser 7 and in series with grid 1 is a thermostat 8 preferably located in a sheltered place in the ambient air for the purpose above described. The rectified supply gives a D.C. input to the transistor 9 and relay 10. A 1/4 watt 2700 ohm resister 11 between the base and emitter of the transistor prevents thermal runaway at high ambient temperatures while a 27K resistor 12 limits the base current to the transistor 9 in case the grids 1 and 2 become shorted. Preferably the electronic parts 6, 7, 9, 11, 12, are mounted in a socket for plug-in application (not shown) and moulded in epoxy resin.

The terminals of the transistor output may be used in connection with outside power to turn on switch heaters or do other tasks but preferably relay 10 is actuated and a set of contacts closes to cause a timer motor 16 across the line to operate a cam switch 17. Closing this switch for a few seconds jumps the transistor 9 and holds the relay closed. When the timer cycle is completed and the cam switch opened again, if the transistor is no longer energized by the grid current, the relay will open, stopping motor 16. If precipitation still persists, another cycle will start. Another set of contacts of relay 10 with outside power 15 and distant indication as by a light 14 permits the situation to be observed.

What I claim is:

1. A snow and sheet detector system including a transistor, comprising
    a precipitation sensing head having a pair of spaced grids one below the other,
    a thermostat positioned in the ambient air,
    a power supply,
    and the input of the transistor
    all in series with said spaced grids,
    a continuous acting heater element in said head below said lower grid and across said power supply,
    a relay in the output circuit of said transistor,
    means to sense the action of said detector, comprising
    a timer motor, controlled by said relay, having a cam switch actuated by said motor and
    connected across the output of said transistor.

2. A unified precipitation sensing head comprising
    a casing having a top member,
    a conducting grid member comprising a coarse screen held to said casing by said top member,
    a second conducting grid member of finer mesh spaced below said first grid within said casing,
    a hollow metal support therefor to which said fine screen is attached and
    a heater member within said support below said second grid member,
    electrical connections to said grids and heater member,
    said casing having drainage means around its periphery below said grids,
    and sealing means for the base of said casing.

3. A unified precipitation sensing head comprising
    a casing of dielectric material having an opening at the top,
    a coarse mesh conducting screen across said opening,
    a non-ferrous metal tube within said casing, having a closed upper end a fine mesh conducting screen soldered to said closed end and spaced slightly below said coarse screen,
a non-conductive support to position said tube,
a heating device within said tube adjacent the closed end,
terminal wires connected to said screens and said device,
means to drain said casing above said non-conductive support, and
means to seal said casing below said support.

References Cited by the Examiner
UNITED STATES PATENTS

| | | | |
|---|---|---|---|
| 2,647,234 | 7/53 | Pear | 200—61.05 X |
| 2,717,957 | 9/55 | Ohlheiser | 328—4 X |
| 3,068,459 | 12/62 | Kreisler | 340—244 X |

FOREIGN PATENTS 853,284  11/60  Great Britain.

SAMUEL BERNSTEIN, *Primary Examiner.*